United States Patent [19]

Tabuchi

[11] Patent Number: 5,297,474
[45] Date of Patent: Mar. 29, 1994

[54] OIL-OVERFLOW ALARMING SYSTEM IN FRYING APPARATUS

[75] Inventor: Yasuhiko Tabuchi, Sapporo, Japan

[73] Assignee: Paloma Kogyo Kabushiki Kaisha, Nagoya, Japan

[21] Appl. No.: 62,122

[22] Filed: May 14, 1993

[30] Foreign Application Priority Data

May 16, 1992 [JP] Japan .................. 4-149844

[51] Int. Cl.⁵ .............................. A47J 37/12
[52] U.S. Cl. ......................... 99/344; 99/330; 99/403; 99/408; 210/167; 210/DIG. 8
[58] Field of Search .................. 99/327–330, 99/331, 337, 342–344, 403, 408; 364/400; 210/184–186, 175, 167, DIG. 8; 126/360 R; 431/1

[56] References Cited

U.S. PATENT DOCUMENTS

| | | | |
|---|---|---|---|
| 3,648,595 | 3/1972 | Morris | 99/342 |
| 4,420,006 | 12/1983 | Moore et al. | 134/167 |
| 4,437,159 | 3/1984 | Waugh | 364/400 |
| 4,444,095 | 4/1984 | Anetsberger et al. | 99/408 |
| 4,623,544 | 11/1986 | Highnote | 99/330 |
| 4,643,824 | 2/1987 | Akazawa et al. | 210/167 |
| 4,668,390 | 5/1987 | Hurley et al. | 99/408 |
| 4,684,412 | 8/1987 | Fritzsche | 99/330 |
| 4,688,475 | 8/1987 | Witt et al. | 364/400 |
| 4,702,827 | 10/1987 | Wenzel | 210/DIG. 8 |
| 4,742,455 | 5/1988 | Schreyer | 364/400 |
| 4,913,038 | 4/1990 | Burkett et al. | 99/331 |
| 4,949,703 | 8/1990 | Ejiri et al. | 126/360 |
| 4,974,501 | 12/1990 | Grob et al. | 99/408 |

FOREIGN PATENT DOCUMENTS 62-60526 3/1987 Japan .
2-36709 3/1990 Japan .
5-25127 4/1993 Japan .

OTHER PUBLICATIONS

Brochure of assignee depicting various types of cookers, date unknown.

*Primary Examiner*—Timothy F. Simone
*Attorney, Agent, or Firm*—Lahive & Cockfield

[57] ABSTRACT

The present invention provides an oil overflow alarming system incorporated in a fryer apparatus. When the fryer apparatus includes a first frypot and a second frypot, a control unit of the oil overflow alarming system detects whether at least one of a second drainage valve unit and a second supply valve unit of the second frypot is in an open position while a first drainage valve unit of the first frypot is open, where cooking oil contained in the first frypot is drained into a cooking oil filtration unit to be filtered and cleaned. When at least either the second drainage valve or the second supply valve is open, the control unit outputs an overflow signal to an alarm unit, which generates an overflow alarm corresponding to the overflow signal to urge an operator to close both the second drainage valve and the second supply valve, thus preventing cooking oil from overflowing from the cooking oil filtration unit or the second frypot.

10 Claims, 5 Drawing Sheets

OIL-OVERFLOW ALARMING SYSTEM IN FRYING APPARATUS

BACKGROUND OF THE INVENTION

1. Field of the Invention

The present invention relates to an oil-overflow alarming system which is incorporated in fryer apparatus used in commercial cooking of food items such as French fries and breaded chicken and works corresponding to opening and closing of a supply valve and a drainage valve of an oil filtering mechanism of the fryer apparatus.

2. Description of the Related Art

In commercial cooking facilities, cooking oil in a frypot is periodically drained therefrom, filtered and cleaned by an oil filtering mechanism, and returned to the frypot to prevent deterioration of cooking oil and allow economical recycle of used cooking oil.

Even when the fryer apparatus includes a plurality of frypots, each being filled with cooking oil, the oil filtering mechanism generally includes only one oil tank with a filter element for saving the space and making the fryer apparatus compact. In this case, the oil tank has a capacity sufficient to receive the whole volume of cooking oil drained from any one of the frypots. Each frypot is connected to a drainage conduit with a drainage valve which is open and closed to initiate and terminate drainage of cooking oil from the frypot to the oil tank, and to a supply conduit with a supply valve which is open and closed to permit or preclude a flow of cooking oil received and filtered in the oil tank and returned to the frypot. Both the drainage valve and the supply valve are operated manually.

When a drainage valve or a supply valve of one frypot is accidentally opened while a drainage valve of another frypot is open for filtration of used cooking oil, cooking oil overflows from the one frypot or the oil tank to damage the floor or injure an operator.

SUMMARY OF THE INVENTION

The object of the invention is to provide a novel oil overflow alarming system incorporated in a fryer apparatus.

The above and other related objects are realized by an oil overflow alarming system of the invention which is incorporated in a fryer apparatus and generates an overflow alarm according to opening and closing conditions of supply and drainage valves of frypots.

The fryer apparatus typically includes: a housing supported on a floor; a plurality of frypots disposed in a side by side arrangement in an upper portion of the housing, each being filled with cooking oil in which food items are fried or cooked; a heating unit for heating cooking liquid contained in each of the plurality of frypots; a plurality of drainage conduit units each connected to each of the plurality of frypots for draining cooking oil therefrom, each drainage conduit having a first end connected to each frypot for receiving cooking oil drained therefrom and a second end for discharging the received cooking oil; a plurality of drainage valve units each disposed in each of the plurality of drainage conduit units, each drainage valve unit being movable between an open position and a close position to initiate and terminate drainage of cooking oil from each frypot through each discharge conduit unit; a cooking oil filtration unit for receiving cooking oil contained in one of the frypots and discharged from the second end of a corresponding drainage conduit unit and filtering the discharged cooking oil; an oil pump unit connected to the cooking oil filtration unit for returning the cooking oil filtered by the cooking oil filtration unit to one of the frypots; a plurality of supply conduit units for flowing cooking oil into each of the plurality of frypots, each supply conduit unit having a first end connected to the oil pump unit for receiving cooking oil and a second end connected to each frypot for discharging the received cooking oil thereinto; and a plurality of supply valve units each disposed in each of the plurality of supply conduit units, each supply valve unit being movable between an open position and a close position to permit and prevent flow of cooking oil into each frypot through each supply conduit unit. The fryer apparatus of the invention further includes an oil overflow alarming system, which includes: a control unit for detecting, while a drainage valve unit for one of the plurality of frypots is open to allow cooking oil contained therein to be drained into the cooking oil filtration unit through a drainage conduit unit, whether at least either a drainage valve unit or a supply valve unit of another frypot is in its open position, and outputting an overflow signal when at least either the drainage valve unit or the supply valve unit of another frypot is in its open position; and an alarm unit for receiving the overflow signal from the control unit and generating an overflow alarm.

For example, when the fryer apparatus includes a first frypot and a second frypot, the control unit of the oil overflow alarming system detects whether at least one of a second drainage valve unit and a second supply valve unit of the second frypot is in an open position while a first drainage valve unit of the first frypot is open, where cooking oil contained in the first frypot is drained into the cooking oil filtration unit to be filtered and cleaned. When at least either the second drainage valve or the second supply valve is open, the control unit outputs an overflow signal to the alarm unit, which generates an overflow alarm corresponding to the overflow signal to urge an operator to close both the second drainage valve and the second supply valve, thus preventing oil from overflowing from the cooking oil filtration unit or the second frypot.

These and other objects, features, aspects, and advantages of the present invention will become more apparent from the following detailed description of the preferred embodiment with the accompanying drawings.

DESCRIPTION OF THE PREFERRED EMBODIMENT

An oil-overflow alarming system embodying the invention is described according to the drawings.

Figure 1:
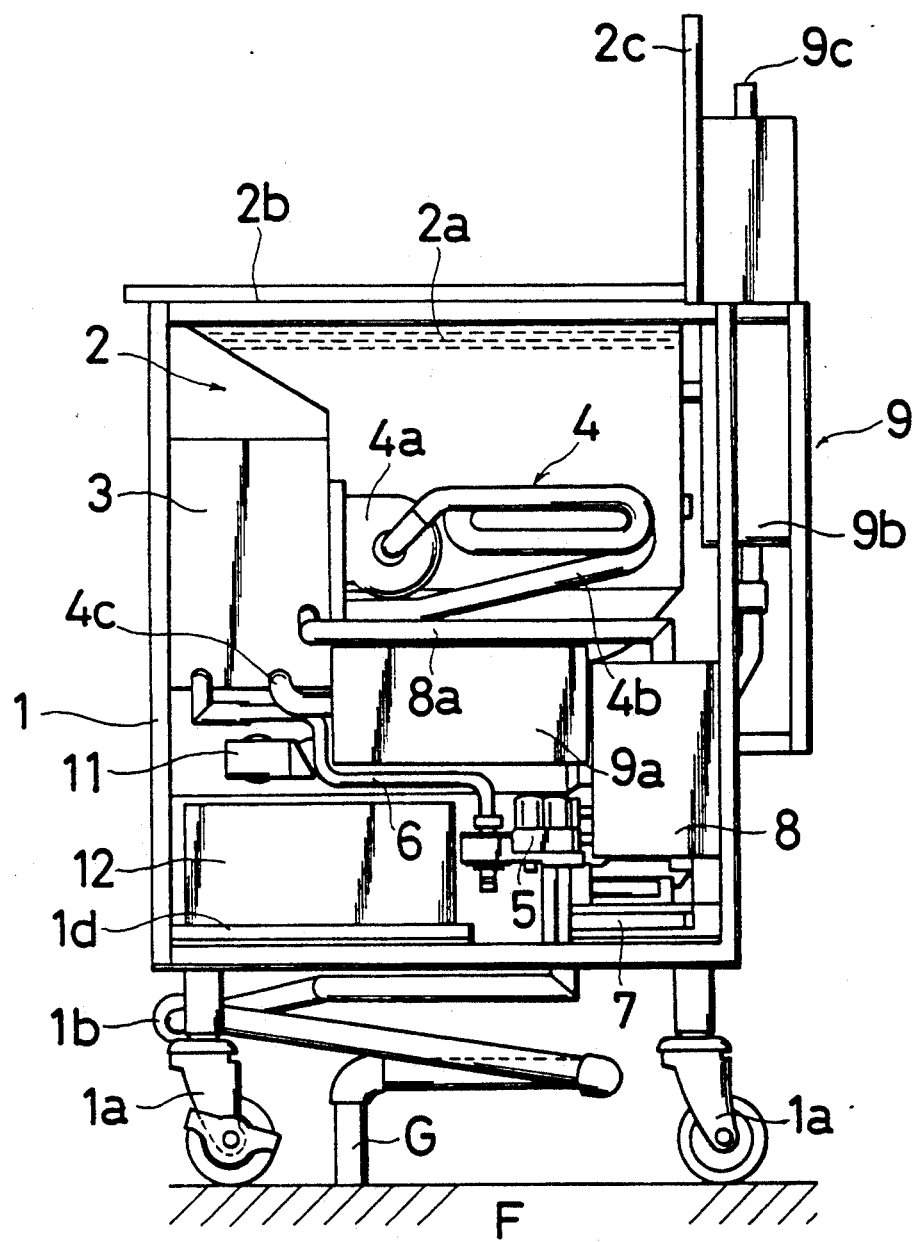
FIG. 1 is a partly omitted cross sectional view schematically illustrating a fryer apparatus used for commercial cooking of food items.
Figure 2:
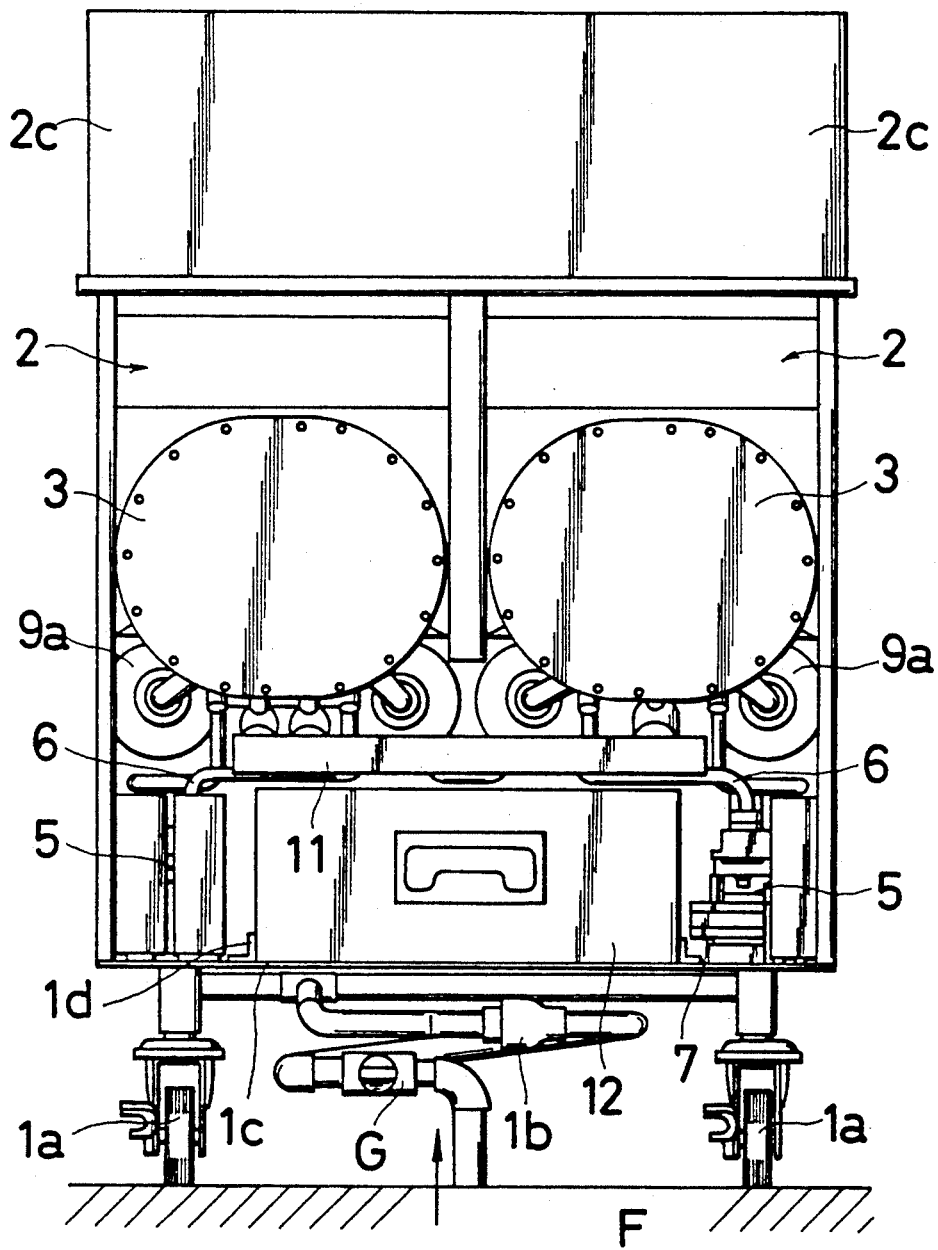
FIG. 2 is a front view showing the fryer apparatus of FIG. 1.
Figure 3:
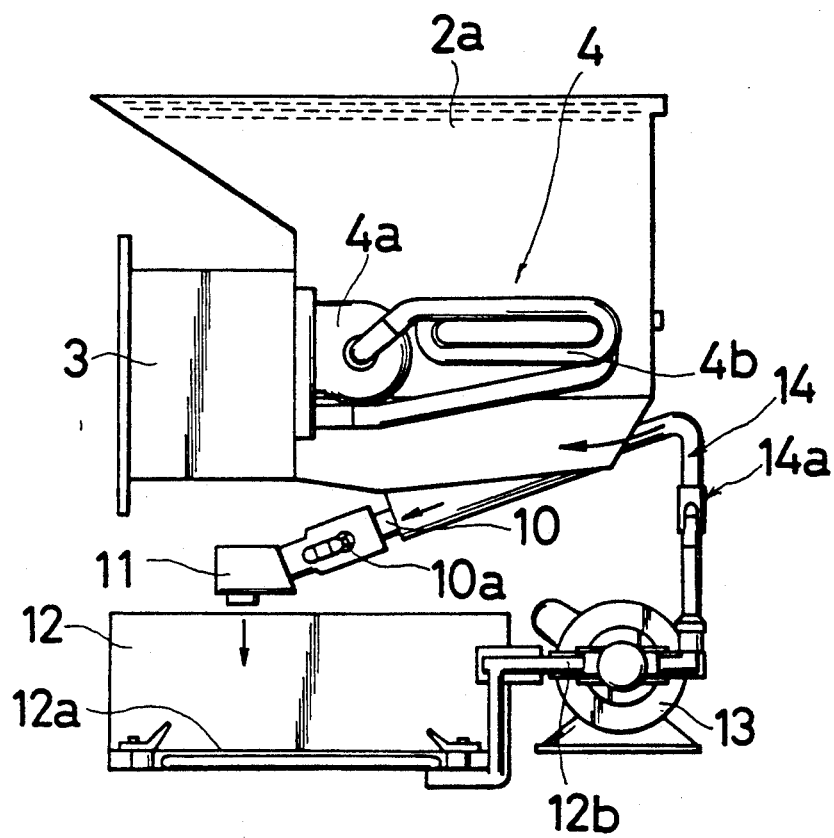
FIG. 3 illustrates a primary portion of an oil filtering mechanism.

FIG. 1 is a partly omitted cross sectional view schematically illustrating a fryer apparatus used for commercial cooking of food items; FIG. 2 is a front view showing the fryer apparatus of FIG. 1; and FIG. 3 illustrates a primary portion of an oil filtering mechanism.

The fryer apparatus of the embodiment includes a housing 1 which is supported on a floor F by wheels 1a fixed outwardly to four corners of a bottom plate 1c of the housing 1, so that the fryer apparatus is movable from one position to another desirable position. A quick joint element 1b disposed on a lower front end of the housing 1 is connected to a gas supply source G. A pair of frypot systems 2 are arranged side by side in an upper portion of the housing 1. Each frypot system 2 includes a frypot element 2a filled with cooking liquid or oil, an apron member 2b horizontally extending over an upper end of the frypot element 2a, and an upright wall member 2c extending upward from a lower end of the frypot element 2a.

A pair of air chambers 3 working corresponding to a pair of pulse combustors 4 are respectively attached outside of the frypot systems 2.

Each pulse combustor 4 for heating cooking oil in the frypot element 2a includes a combustion chamber 4a screwed on an inner surface of a side wall of the frypot element 2a, and a tail pipe 4b looping and passing through the frypot element 2a. The tail pipe 4b has one end fixed to an outlet of the combustion chamber 4a and the other end piercing through a side wall of the air chamber 3 to connect with a pipe extension element 4c fixed to the side wall of the air chamber 3.

A gas supply conduit 6 with an electromagnetic valve 5 is connected to each air chamber 3. An electric fan 7 and an intake muffler 8 are also connected to each air chamber 3 via an air supply conduit 8a.

Each pulse combustor 4 also has a silencer unit 9 including a first exhaust muffler 9a arranged in a lower rear portion of the frypot system 2, a second exhaust muffler 9b arranged in an upper rear portion of the frypot system 2 and connected to the first exhaust muffler 9a in series, and a discharge pipe 9c connected to and disposed on an upper end of the second exhaust muffler 9b for discharging combustion exhaust to the atmosphere. The first exhaust muffler 9a has a first end connected to the pipe extension element 4c, and a second end connected to a first end of the second exhaust muffler 9b. A second exhaust muffler 9b is connected on a second end or upper end thereof to the discharge pipe 9c.

An oil tank 12 with a filter element 12a for filtering cooking oil in each frypot element 2a is supported on the bottom plate 1c of the housing 1 and movable out of and into the housing 1 along a pair of L-shaped guide frames 1d. The oil tank 12 is detachably connected via a quick joint element 12b to an oil pump 13 for returning cooking oil into each frypot element 2a. Namely, the oil tank 12 is easily attachable to and removable from the fryer apparatus by connecting and disconnecting the quick joint element 12b. The oil tank 12 has a capacity sufficient to receive the whole volume of any one of the frypot elements 2a.

As shown in FIG. 3, each frypot element 2a is connected to a drainage conduit 10 with a drainage valve 10a, which is further connected to a drainage connection element 11. The oil pump 13 is connected to each frypot element 2a via a supply conduit 14 with a supply valve 14a.

In operation, when one of the drainage valves 10a is open, cooking oil contained in the corresponding frypot element 2a is discharged therefrom to the oil tank 12 via the drainage conduit 10 and the drainage connection element 11. The cooking oil received in the oil tank 12 is filtered through the filter element 12a and pumped up by the oil pump 13 to be returned to the frypot element 2a via the supply conduit 14 and the supply valve 14a.

Figure 4:
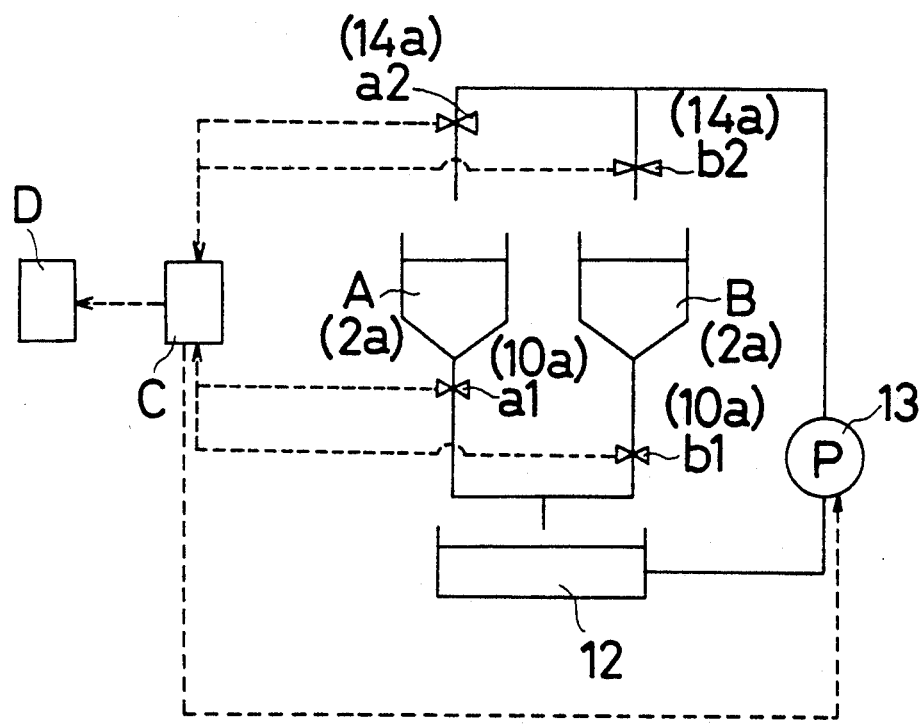
FIG. 4 is a conceptive view showing an oil overflow alarming system of the embodiment.

FIG. 4 is a conceptive view showing an oil overflow alarming system of the embodiment. In the following description, the frypot elements 2a are shown by first and second frypots A and B, the corresponding drainage valves 10a by first and second drainage valves a1 and b1, and the corresponding supply valves 14a by first and second supply valves a2 and b2.

In the oil overflow alarming system of the embodiment, each of the drainage valves a1 and b1 (10a) and the supply valves a2 and b2 (14a) has a microswitch (not shown) which connects to a control unit C to output an opening or closing signal thereto. The opening signal represents that the valve a1, b1, a2, or b2 (10a or 14a) is in its open position, and the closing signal shows that the valve a1, b1, a2, or b2 (10a or 14a) is in its close position. The control unit C outputs an alarm signal to an alarm unit D corresponding to the opening and closing signals of the drainage valves a1 and b1 (10a) and the supply valves a2 and b2 (14a).

Figure 5:
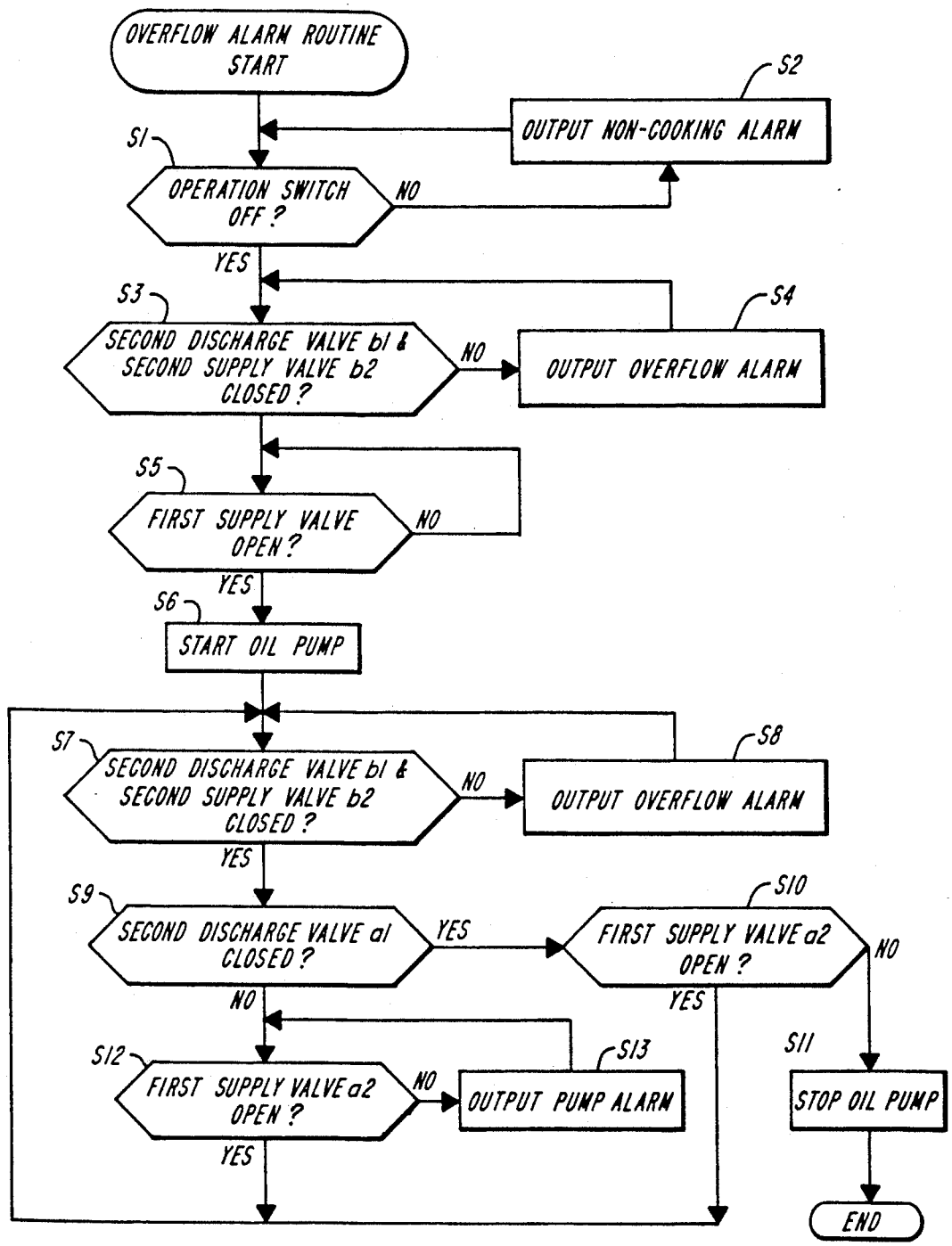
FIG. 5 is a flowchart showing a typical example of an overflow alarm routine executed by the control unit C of FIG. 4.

FIG. 5 is a flowchart showing a typical example of an overflow alarm routine executed by the control unit C when the first drainage valve a1 is open to drain cooking oil from the first frypot A to the oil tank 12.

The overflow alarm routine of FIG. 5 starts when the first drainage valve a1 is open to discharge cooking oil from the first frypot A. At step S1, it is determined whether an operation switch (not shown) of the pulse combustor 4 is turned off. When the answer is NO at step S1, the program proceeds to step S2 at which the alarm unit D generates a non-cooking alarm corresponding to a non-cooking signal output by the control unit C to urge an operator to turn off the operation switch so as to prevent the frypot A from being heated without cooking oil. The control unit C outputs an end of non-cooking alarm signal to the alarm unit D to stop the non-cooking alarm when the operation switch is turned off.

When the answer is YES at step S1, the program proceeds to step S3 at which it is determined whether both the second drainage valve b1 and the second supply valve b2 of the frypot B are closed. When either the second drainage valve b1 or the second supply valve b2 is open, the program goes to step S4 at which the alarm unit D generates an overflow alarm corresponding to an overflow signal output from the control unit C to urge an operator to close both the second drainage valve b1 and the second supply valve b2. The control unit C outputs an end of overflow alarm signal to the alarm unit D to stop the overflow alarm when both the second drainage valve b1 and the second supply valve b2 are closed.

When both the second drainage valve b1 and the second supply valve b2 are closed at step S3, the program goes to step S5 at which it is determined whether the first supply valve a2 of the frypot A is open. When the first supply valve a2 is open at step S5, the program proceeds to step S6 at which the control unit C activates the oil pump 13 to permit a flow of cooking oil drained by the frypot A and filtered and cleaned by the oil tank 12 to be returned to the frypot A via the first supply valve a2.

While the oil pump 13 is driven to return the cooking oil to the frypot A, the control unit C repeatedly checks that both the second drainage valve b1 and the second supply valve b2 of the frypot B are closed at step S7. When either the second drainage valve b1 or the second supply valve b2 is opened accidentally, the program goes to step S8 at which the alarm unit D generates an overflow alarm corresponding to an overflow signal output from the control unit C to urge an operator to close both the second drainage valve b1 and the second supply valve b2.

At the subsequent step S9, it is determined whether the first drainage valve a1 of the frypot A is closed. When the first drainage valve a1 is closed to stop drainage of cooking oil from the frypot A, the program goes to step S10 at which it is determined whether the first supply valve a2 is open. When the first supply valve a2 is closed at step S10, the program goes to step S11 at which the control unit C stops the oil pump 13. On the other hand, when the first supply valve a2 is open at step S10, the program returns to step S7.

When the first drainage valve a1 is open to continue drainage of cooking oil from the frypot A at step S9, the program goes to step S12 at which it is determined whether the first supply valve a2 is open. When the first supply valve a2 is closed at step S12, the program proceeds to step S13 at which the alarm unit D generates a pump alarm corresponding to a pump signal output by the control unit C to urge an operator to open the first supply valve a2. The control unit C outputs an end of pump alarm signal to the alarm unit D to stop the pump alarm when the first supply valve a2 is opened. When the first supply valve a2 is open at step S12, the program returns to step S7.

The alarm unit D may include one or a plurality of buzzers, lamps, or any other alarming elements to generate the non-cooking alarm, the overflow alarm, and the pump alarm.

As described above, the oil overflow alarming system of the embodiment generates the overflow alarm corresponding to the opening and closing conditions of the drainage valves and supply valves, thus effectively preventing cooking oil from overflowing from the frypot or the oil tank to damage the floor or injure the operator.

Although the fryer apparatus of the above embodiment includes a pair of frypots and other corresponding elements including the drainage valves 10a and the supply valves 14a, the fryer apparatus may include any desirable number of frypots with corresponding elements.

Since the invention may be embodied in other forms without departing from the scope or spirit of essential characteristics thereof, it is clearly understood that the above embodiment is only illustrative and not restrictive in any sense. The spirit and scope of the present invention is limited only by the terms of the appended claims.

What is claimed is:

1. A fryer apparatus used in commercial cooking facilities for cooking food items in cooking liquid or oil, said fryer apparatus comprising:
   a housing supportable on a floor and having a bottom plate and side walls;
   a plurality of frypots disposed in a side by side arrangement in an upper portion of said housing, each being filled with cooking oil in which food items are fried or cooked;
   heating means for heating cooking liquid contained in each of said plurality of frypots;
   a plurality of drainage conduit means each connected to each of said plurality of frypots for draining cooking oil therefrom, each drainage conduit having a first end connected to each frypot for receiving cooking oil drained therefrom and a second end for discharging the received cooking oil;
   a plurality of drainage valve means each disposed in each of said plurality of drainage conduit means, each drainage valve means being movable between an open position and a close position to initiate and terminate drainage of cooking oil from each frypot through each discharge conduit means;
   cooking oil filtration means for receiving cooking oil contained in one of said plurality of frypots and discharged from the second end of one of said drainage conduit means corresponding to said one of frypots and filtering the discharged cooking oil;
   oil pump means connected to said cooking oil filtration means for returning the cooking oil filtered by said cooking oil filtration means to said one of frypots;
   a plurality of supply conduit means for flowing cooking oil into each of said plurality of frypots, each supply conduit means having a first end connected to said oil pump means for receiving cooking oil and a second end connected to each frypot for discharging the received cooking oil thereinto; and
   a plurality of supply valve means each disposed in each of said plurality of supply conduit means, each supply valve means being movable between an open position and a close position to permit and prevent flow of cooking oil into each frypot through each supply conduit means,
   said fryer apparatus further comprising an oil overflow alarming system for generating an overflow alarm,
   said oil overflow alarming system comprising:
   control means for detecting, while drainage valve means for one of said plurality of frypots is open to allow cooking oil contained therein to be drained into said cooking oil filtration means through drainage conduit means, whether at least either drainage valve means or supply valve means of another frypot is in its open position, and outputting an overflow signal when at least either said drainage valve means or said supply valve means of said another frypot is in its open position; and
   alarm means for receiving said overflow signal from said control means and generating an overflow alarm.

2. A fryer apparatus in accordance with claim 1, wherein said heating means comprises a pulse combustor.

3. A fryer apparatus in accordance with claim 2, wherein said cooking oil filtration means further comprises an oil tank, and a filtration element fixed to a bottom of said oil tank.

4. A fryer apparatus in accordance with claim 3, wherein said cooking oil filtration means further comprises a pair of L-shaped guide frames, and said oil tank is directly mounted on said bottom plate of said housing and movable out of and into said housing along said pair of L-shaped guide frames.

5. A fryer apparatus in accordance with claim 4, said oil tank is connected to said oil pump means via quick joint means.

6. An oil overflow alarming system incorporated in a fryer apparatus, which comprises a housing supportable on a floor; a plurality of frypots disposed in a side by side arrangement in an upper portion of said housing, each being filled with cooking oil in which food items are fried or cooked; heating means for heating cooking liquid contained in each of said plurality of frypots; a plurality of drainage conduit means each connected to each of said plurality of frypots for draining cooking oil therefrom, each drainage conduit having a first end connected to each frypot for receiving cooking oil drained therefrom and a second end for discharging the received cooking oil; a plurality of drainage valve means each disposed in each of said plurality of drainage conduit means, each drainage valve means being movable between an open position and a close position to initiate and terminate drainage of cooking oil from each frypot through each discharge conduit means; cooking oil filtration means for receiving cooking oil contained in one of said plurality of frypots and discharged from the second end of one of said drainage conduit means corresponding to said one of frypots and filtering the discharged cooking oil; oil pump means connected to said cooking oil filtration means for returning the cooking oil filtered by said cooking oil filtration means to said one of frypots; a plurality of supply conduit means for flowing cooking oil into each of said plurality of frypots, each supply conduit means having a first end connected to said oil pump means for receiving cooking oil and a second end connected to each frypot for discharging the received cooking oil thereinto; and a plurality of supply valve means each disposed in each of said plurality of supply conduit means, each supply valve means being movable between an open position and a close position to permit and prevent flow of cooking oil into each frypot through each supply conduit means, said oil overflow alarming system comprising:

control means for detecting, while one drainage valve means for one of said plurality of frypots is open to allow cooking oil contained therein to be drained into said cooking oil filtration means through one drainage conduit means, whether at least either drainage valve means or supply valve means of another frypot is in its open position, and outputting an overflow signal when at least either said drainage valve means or said supply valve means of said another frypot is in its open position; and alarm means for receiving said overflow signal from said control means and generating an overflow alarm.

7. An oil overflow alarming system in accordance with claim 6, wherein said control means controls said oil pump means to permit or preclude a flow of cooking oil drained from one of said plurality of frypots, filtered and cleaned by said cooking oil filtration means, and returned to said one of frypots via one of said supply valve means corresponding to said one of frypots.

8. An oil overflow alarming system in accordance with claim 7, wherein said heating means comprises a pulse combustor and an operation switch for activating said pulse combustor.

9. An oil overflow alarming system in accordance with claim 8, wherein said control means outputs a non-cooking signal when said one drainage valve means is open and said operation switch is still ON, and said alarm means generates a non-cooking alarm corresponding to said non-cooking signal.

10. An oil overflow alarming system in accordance with claim 7, wherein said control means outputs a pump signal when said one drainage valve means is open and one supply valve means corresponding to said one drainage valve means is closed, and said alarm means generates a pump alarm corresponding to said pump signal.

* * * * *